(12) United States Patent
Naruse et al.

(10) Patent No.: US 10,263,305 B2
(45) Date of Patent: Apr. 16, 2019

(54) MAGNESIUM OXYGEN BATTERY

(71) Applicants: DENSO CORPORATION, Kariya-shi, Aichi-ken (JP); THE REGENTS OF THE UNIVERSITY OF MICHIGAN, Ann Arbor, MI (US)

(72) Inventors: Junichi Naruse, Kariya (JP); Donald Siegel, Ann Arbor, MI (US)

(73) Assignees: DENSO CORPORATION, Kariya, Aichi-pref. (JP); The Regents of The University of Michigan, Ann Arbor, MI (US)

( * ) Notice: Subject to any disclaimer, the term of this patent is extended or adjusted under 35 U.S.C. 154(b) by 697 days.

(21) Appl. No.: 14/955,618

(22) Filed: Dec. 1, 2015

(65) Prior Publication Data

US 2017/0155108 A1 Jun. 1, 2017

(51) Int. Cl.
*H01M 12/08* (2006.01)
(52) U.S. Cl.
CPC ........ *H01M 12/08* (2013.01); *H01M 2220/20* (2013.01)
(58) Field of Classification Search
CPC .................... H01M 12/08; H01M 2220/20
See application file for complete search history.

(56) References Cited

U.S. PATENT DOCUMENTS

| 8,691,444 | B2 | 4/2014 | Visco et al. |
|---|---|---|---|
| 2003/0036001 | A1 | 2/2003 | James et al. |
| 2005/0175894 | A1 | 8/2005 | Visco et al. |
| 2007/0037058 | A1 | 2/2007 | Visco et al. |
| 2007/0117007 | A1 | 5/2007 | Visco et al. |
| 2007/0212583 | A1* | 9/2007 | Johnson ............... H01M 12/06 429/405 |
| 2007/0243454 | A1 | 10/2007 | Klaassen |
| 2010/0266901 | A1 | 10/2010 | Johnson |
| 2010/0285375 | A1 | 11/2010 | Friesen et al. |
| 2011/0281184 | A1 | 11/2011 | Friesen et al. |
| 2012/0088163 | A1* | 4/2012 | Ryu .................... C03C 10/0027 429/405 |
| 2014/0011101 | A1 | 1/2014 | Ma et al. |
| 2014/0045071 | A1 | 2/2014 | Sakakibara et al. |
| 2014/0072884 | A1 | 3/2014 | Zhang et al. |

(Continued)

FOREIGN PATENT DOCUMENTS

| JP | H0927319 A | 1/1997 |
|---|---|---|
| JP | H11307116 A | 11/1999 |

(Continued)

OTHER PUBLICATIONS

Md. A. Rahman, X. Wang, C. Wen. High Energy Density Metal-Air Batteries: A Review, Journal of The Electrochemical Society, 160 (10) A1759-A1771 (2013).*

(Continued)

*Primary Examiner* — Carlos Barcena
(74) *Attorney, Agent, or Firm* — Harness, Dickey & Pierce, P.L.C.

(57) ABSTRACT

A rechargeable magnesium oxygen battery including a negative electrode, a positive electrode, a non-aqueous magnesium ion electrolyte layer between the negative and positive electrodes, and an oxygen restrictor. The oxygen restrictor is configured to restrict oxygen crossover from the positive electrode to the negative electrode.

13 Claims, 3 Drawing Sheets

(56) References Cited

U.S. PATENT DOCUMENTS

2014/0186724 A1 7/2014 Hammond et al.
2014/0356736 A1* 12/2014 Choi .................. H01M 4/62
                                                          429/405

FOREIGN PATENT DOCUMENTS

| JP | 2008146963 A | 6/2008 |
| JP | 2009505355 A | 2/2009 |
| JP | 2012527090 A | 11/2012 |
| JP | 2013127908 A | 6/2013 |
| JP | 2013530494 A | 7/2013 |
| JP | 2014063711 A | 4/2014 |
| JP | 2014143170 A | 8/2014 |

OTHER PUBLICATIONS

T. Zhang, Z. Tao, J. Chen. Magnesium—air batteries: from principle to application, Mater. Horiz., 2014, 1, 196.*

* cited by examiner

MAGNESIUM OXYGEN BATTERY

FIELD

The present disclosure relates to a magnesium oxygen battery.

BACKGROUND

This section provides background information related to the present disclosure, which is not necessarily prior art.

Rechargeable magnesium oxygen batteries are suitable for use in hybrid and electric vehicles for vehicle propulsion, but are subject to improvement. For example, with magnesium oxygen batteries it is typically desirable for magnesium ions of a negative electrode to react with oxygen within a positive electrode during discharge. However, in some instances, oxygen may cross over from the positive electrode to the negative electrode to cause a reaction between oxygen and magnesium at the negative electrode, which can undesirably result in formation of metal oxide compounds on the negative electrode having high resistance and/or lower the activity of the negative electrode, resulting in lower cell voltage. It would therefore be desirable to have a rechargeable high voltage magnesium oxygen battery that prevents oxygen from crossing over from the positive electrode to the negative electrode, thus preventing formation of high resistance metal oxides at the negative electrode. The present teachings address this need in the art. In the case of a lithium-oxygen battery, Li ion solid electrolyte, such as $Li_3PS_4$, can be used as an $O_2$ pass prevention material. But there is no magnesium conductive solid electrolyte that is operable at room temperature. The present teachings advantageously prevent $O_2$ cross-over in magnesium-oxygen batteries.

SUMMARY

This section provides a general summary of the disclosure, and is not a comprehensive disclosure of its full scope or all of its features.

The present teachings provide for a rechargeable magnesium oxygen battery including a negative electrode, a positive electrode, a non-aqueous magnesium ion electrolyte layer between the negative and positive electrodes, and an oxygen restrictor. The oxygen restrictor is configured to restrict oxygen crossover from the positive electrode to the negative electrode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and is not intended to limit the scope of the present disclosure.

DETAILED DESCRIPTION

Example embodiments will now be described more fully with reference to the accompanying drawings.

Figure 1:
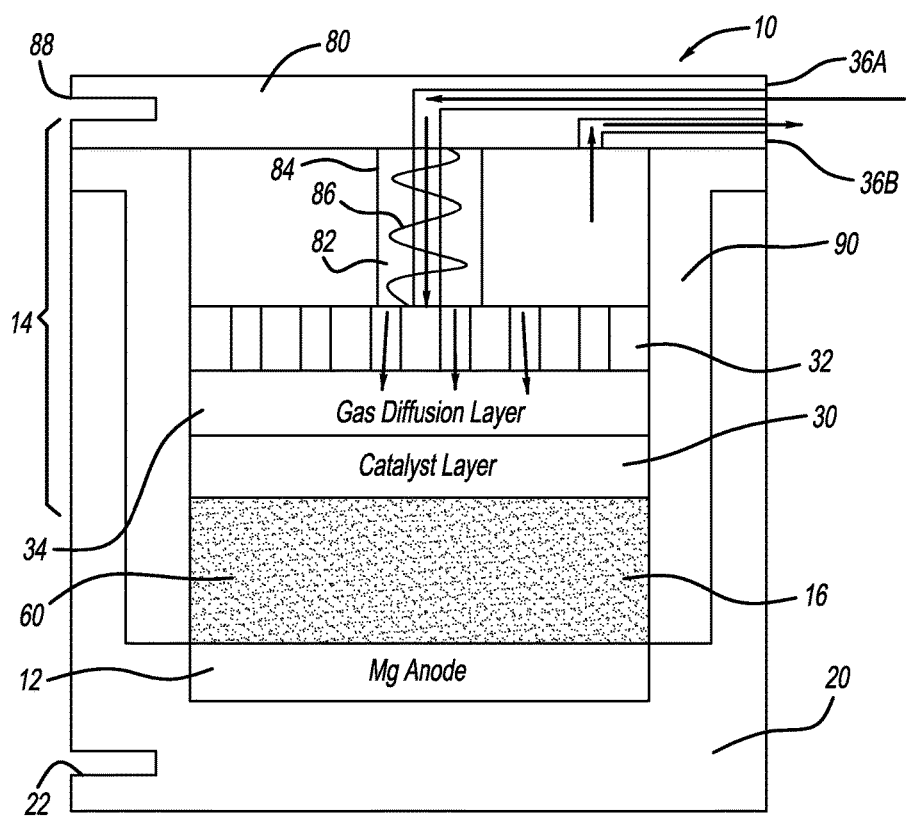
FIG. 1 is a cross-sectional view of a rechargeable magnesium oxygen battery according to the present teachings.

With reference to FIG. 1, an exemplary rechargeable magnesium oxygen battery according to the present teachings is illustrated at reference numeral 10. The battery 10 generally includes a negative electrode 12, a positive electrode 14, and a non-aqueous electrolytic solution 16 between the negative electrode 12 and the positive electrode 14. The arrangement of the battery 10 illustrated is for exemplary purposes only. The battery 10 can have numerous other configurations in addition to the configuration illustrated in FIG. 1.

The negative electrode 12 can be any suitable electrode configured to adsorb magnesium and release magnesium ions. The negative electrode 12 may include any suitable active material layer configured to adsorb and release the magnesium ion. The active material of the negative electrode 12 is not limited to a specific material. Instead, the active material may be any suitable conventional material. For example, the negative electrode 12 may include any suitable alkaline metal (lithium or sodium, for example), or may include any suitable alkaline-earth metal. The active material can be metallic magnesium having a diameter of 14 millimeters and a thickness of 0.1 millimeters (with 99.9% purity made by Goodfellow Cambridge Limited, for example). Alternatively, the active material may be a metallic material such as magnesium alloy, or a compound for adsorbing and releasing the magnesium ion. Still further, the active material may be a combination of these materials. An accessory component of the magnesium alloy may be included, such as aluminum, zinc, manganese, silicon, calcium, iron, copper or nickel. The negative electrode 12 can be arranged in any suitable manner, such as on a lower casing 20 of the battery 10, for example. The lower casing 20 may be made of any suitable material, such as stainless steel. The lower casing 20 can include an electrical connection location 22 for the negative electrode 12.

The negative electrode 12 can include any suitable compound for adsorbing and releasing magnesium ions, such as graphite or any other suitable material having a large capacity for charge storage. Alternatively, the compound may be made of a group 4B metallic element in the short format periodic table (or any other suitable metallic element), or a single body or alloy of half metal, such as silicon and tin, or the like. Specifically, the compound may be made of an alloy including silicon and/or tin, or a carbon material such as graphite and amorphous carbon. A single body of these compounds may be used as the active material. Alternatively, a combination of these compounds may be used as the active material.

When the active material layer is distributed on the negative electrode 12, the active material layer may be applied to a current collector to form the negative electrode 12. Any suitable current collector may be used as long as the current collector has suitable conductivity. The current collector may be, for example, a foil or a mesh of copper, stainless steel, titanium or nickel. Further, any other suitable part of the battery 10 including these materials may act as the current collector.

The positive electrode 14 may be any electrode suitable for producing a discharge product that includes magnesium and oxygen, such as magnesium oxide (MgO), magnesium peroxide ($MgO_2$), and magnesium superoxide ($Mg(O_2)_2$) during discharge of the battery 10. The discharge product can be any binary compound containing $Mg_xO_y$ where "x" and "y" are integers and "x" may or may not be equal to "y." The positive electrode 14 can be preloaded with any suitable catalyst (or accelerator) in order to promote production of magnesium oxide products during discharge of the battery 10. For example and as illustrated in FIG. 1, the positive electrode 14 may have a catalyst layer 30 including a promoter or catalyst, such as $MnO_2$ for example. The catalyst layer 30 may be arranged adjacent to the non-aqueous electrolyte solution 16, and between the non-aqueous electrolyte solution 16 and a gas diffusion layer 34. The gas diffusion layer 34 is between the catalyst layer 30 and a current collector 32.

Between the catalyst layer 30 and the negative electrode 12 is a separator (not specifically shown). The separator can be any suitable separator, such as a glass fiber separator (ECC1-01-0012-A/L) from EL-Cell GmbH of Germany. The separator can be any suitable separator configured to insulate the negative electrode 12 and the positive electrode 14 electrically so that the non-aqueous electrolytic solution 16 permeates the separator. The separator can be, for example, a porous synthetic resin film such as polyolefin polymer porous film. Specifically, the separator can be a polyethylene polymer porous film or a polypropylene porous film. Alternatively, the separator may be a resin non-woven cloth, a glass fiber non-woven cloth, or the like. The non-aqueous electrolytic solution 16 is between the catalyst layer 30 of the positive electrode 14 and the negative electrode 12. The electrolyte solution 16 may be any suitable electrolyte solution, such as a non-aqueous magnesium ion conductor, suitable for providing conduction of a magnesium ion between the negative electrode 12 and the positive electrode 14.

The non-aqueous electrolytic solution 16 may include any suitable organic solvent, such as one kind or a combination of multiple kinds of conventional non-aqueous electrolytic solutions. For example, the organic solvent may be cyclic ester, chained ester, cyclic ether, chained ether, cyclic carbonate, chained carbonate, or a combination of these solvents. Specifically, an exemplary chained ether compound is diethylene glycol dimethyl ether. An exemplary cyclic ether compound is tetrahydrofuran. An exemplary cyclic carbonate is ethylene carbonate or propylene carbonate. An exemplary chained carbonate is dimethyl carbonate or diethyl carbonate. When the non-proton organic solvent has a high degree of solubility of oxygen, the oxygen dissolved is used effectively for the reaction. The ionic liquid is not limited to a specific liquid as long as the ionic liquid is used for the non-aqueous electrolytic solution in the rechargeable battery 10. An exemplary cation component is 1-methyl-3-ethyl imidazolium cation or diethyl methyl (methoxy) ammonium cation. An exemplary anion component is $BF_4^-$ or $(SO_2C_2F_5)_2N^-$.

The positive electrode 14 can be an air electrode including any suitable active material, such as oxygen gas. As illustrated in FIG. 1, the battery 10 can include an oxygen inlet 36A (and an oxygen outlet 36B) for introducing external air with oxygen, such as atmospheric air, by way of perforated current collector 32 and gas diffusion layer 34 for diffusing the oxygen gas to the catalyst layer 30. More specifically, the oxygen inlet 36A can extend through a cap 80 of the battery 10, which can be a stainless steel cap 80, and through a bore 82 defined by a polytetrafluoroethylene (PTFE) rod 84 arranged between the cap 80 and the current collector 32 to direct oxygen to the current collector 32. The PTFE rod 84 can include a spring 86, or any other suitable device, to compress the contents of the battery 10. The spring 86 may be any suitable conductive spring, such as a gold plated spring. Thus, the cap 80 can be conducted to the positive electrode 14 by way of the gold plated spring 86 press-bonded to the current collector 32 and insulated from the stainless steel of the lower casing 20. A polytetrafluoroethylene (PTFE) layer 90 insulates the negative electrode 12 and the positive electrode 14. The oxygen gas may be in the external air or supplied from a high concentration oxygen container, which can be filled using any suitable method. For example, the oxygen gas may be supplied from a pure oxygen gas container or other oxygen storage device.

The gas diffusion layer 34 can be any suitable gas diffusion layer. For example, the gas diffusion layer 34 can include carbon paper (SigraCet25 BC made by Ion Power, for example). The gas diffusion layer 34 can be mounted on the current collector 32. An electrical connection point 88 for the positive electrode 14 can be included at the cap 80. The positive electrode 14 can thus be an air electrode including the current collector 32, the catalyst layer 30, the carbon paper of the gas diffusion layer 34, and the oxygen gas.

The catalyst layer 30 includes any suitable compound that promotes the formation of discharge products that are easily oxidized during recharge, such as $MnO_2$ for example. In view of the smooth progression of the electrochemical reaction, the oxidation catalyst and/or the catalyst layer 30 may have high conductivity. In this case, the promoter may include a conductive member and/or a bonding member for bonding the conductive member and the promoter. The conductive member may be any suitable conductive member having suitable conductivity. For example, the conductive member may be carbon material or metallic powder. The carbon material can be, for example, graphite, acetylene black, ketjen black, carbon black, or carbon fiber. The bonding member can be any suitable bonding member. For example, the bonding member can be polyvinylidene difluoride (PVDF), polytetrafluoroethylene (PTFE), fluorinated ethylene ethylene-propylene copolymer (fluorine resin copolymer), or rubber resin such as ethylene propylene diene monomer (EPDM), styrene-butadiene rubber, and nitrile rubber.

The gas diffusion layer 34 diffuses the oxygen gas introduced from the inlet 36A to the catalyst layer 30 during a discharge reaction of the battery 10. When the battery 10 is being recharged, the gas diffusion layer 34 diffuses the produced oxygen gas to the outlet 36B. The gas diffusion layer 34 may be, for example, a conductive sheet made of carbon or the like and may be porous. For example, the gas diffusion layer 34 can include carbon paper, a carbon cloth, or a carbon felt, for example.

The current collector 32 is configured to collect current, which is generated by the electrochemical reaction of the battery 10. The current collector 32 can be made of any material having suitable conductivity. For example, the current collector 32 can include nickel, stainless steel, platinum, aluminum, or titanium. The current collector 32 can have any suitable shape, and can be a foil, a plate, or a mesh, for example. To secure diffusion of the oxygen gas, the current collector 32 can have a mesh shape, for example. In the example illustrated, the current collector 32 can be perforated and include stainless steel coated with platinum.

The battery 10 is not limited to a specific shape. For example, the battery 10 can have a coin shape, a cylindrical shape, a square shape, or the like. The battery 10 is not limited to a specific vessel. For example, the vessel may be a vessel made of metal or resin, which maintains an outer shape, a soft vessel such as laminate pack, or the like. The vessel of the battery 10, may be an open-air type vessel or a closed type vessel when the battery 10 includes the air electrode.

During discharge of the battery 10, discharge products that include at least magnesium and oxygen, as explained above, are produced at the positive electrode 14. The discharge products, such as $MgO_x$ ($MgO$, $MgO_2$, or $Mg(O_2)_2$), are produced during the discharging process using oxygen as the positive electrode active material. With respect to magnesium peroxide ($MgO_2$), the electrochemical reaction to be promoted at the positive electrode 14 in the discharging process is the following:

$$Mg^{2+}+O_2+2e- \rightarrow MgO_2$$

With respect to magnesium oxide (MgO), the electrochemical reaction to be promoted at the positive electrode 14 in the discharging process is:

$$2Mg^{2+}+O_2+4e- \rightarrow 2MgO$$

With respect to $MgO_2$, the electrochemical reaction promoted at the positive electrode 14 during charging of the battery 10 is the following:

$$MgO_2 \rightarrow Mg^{2+}+O_2+2e-$$

With respect to MgO, the electrochemical reaction promoted at the positive electrode 14 during charging of the battery 10 is the following:

$$2MgO \rightarrow 2Mg^{2+}+O_2+4e-$$

During discharge of the battery 10, at the negative electrode 12 the metal magnesium as the negative electrode active material discharges a electrons so that magnesium ions are produced. Thus, the magnesium ions are soluble in the non-aqueous type magnesium ion conductor. At the positive electrode 14, oxygen receives the electrons, which are discharged from the magnesium at the negative electrode, through an external circuit so that the oxygen is reduced and ionized. Further, the oxygen ion is combined with the magnesium ion in the electrolyte solution 16 so that the discharge product is formed according to the reaction above.

When the battery 10 is charged, the discharge product is easily decomposed so that the electron is retrieved from the product. Thus, the oxygen ion is oxidized to release oxygen. Further, the magnesium ion is released to the non-aqueous electrolytic solution 16 according to the equation above. At the negative electrode 12, the magnesium ion in the non-aqueous electrolytic solution 16 receives the electron, which is retrieved from the discharge product, through the external circuit, so that the metal magnesium is formed.

The battery 10 further includes an oxygen restrictor configured to restrict oxygen ($O_2$) from crossing over from the positive electrode 14 to the negative electrode 12, where oxygen may undesirably react with the magnesium negative electrode 12 to produce a metal oxide compound having high resistance, while allowing for high conductivity of magnesium ions through the electrolytic solution 16. The oxygen restrictor can be any suitable material, compound, membrane, device, etc. configured to prevent oxygen from crossing over to the negative electrode 12 from the positive electrode 14, which can undesirably result in formation of metal oxide compounds on the negative electrode having high resistance and/or lower the activity of the negative electrode, resulting in lower cell voltage. For example, the oxygen restrictor can be a membrane that selectively allows passage of $Mg^{2+}$, while prohibiting the passage/cross-over of oxygen to the negative electrode 12. As illustrated in FIG. 1 for example, an oxygen restrictor material or compound 60 can be present in the electrolyte solution 16. The oxygen restrictor material or compound 60 can be any suitable material or compound, such as any suitable oxygen adsorbent material including, but not limited to, any suitable perovskite-type oxide, brown millerite type oxide, porous metal complex, or gas adsorbent material. Particular oxygen adsorbent materials that may be used include, but are not limited to, the following: $CeO_2$, $CeO_2$—$Zr$—$O_2$, $Ba(Sr)FeO_3$, $BaYMn_2O_5$, $Ca_2(Al_{0.5}Mn_{0.5})_2O_5$, or porous electrically-insulating compounds such as: porous ceramics, mesa porous silica, alumina-silica gel, or zeolite.

Figure 2:
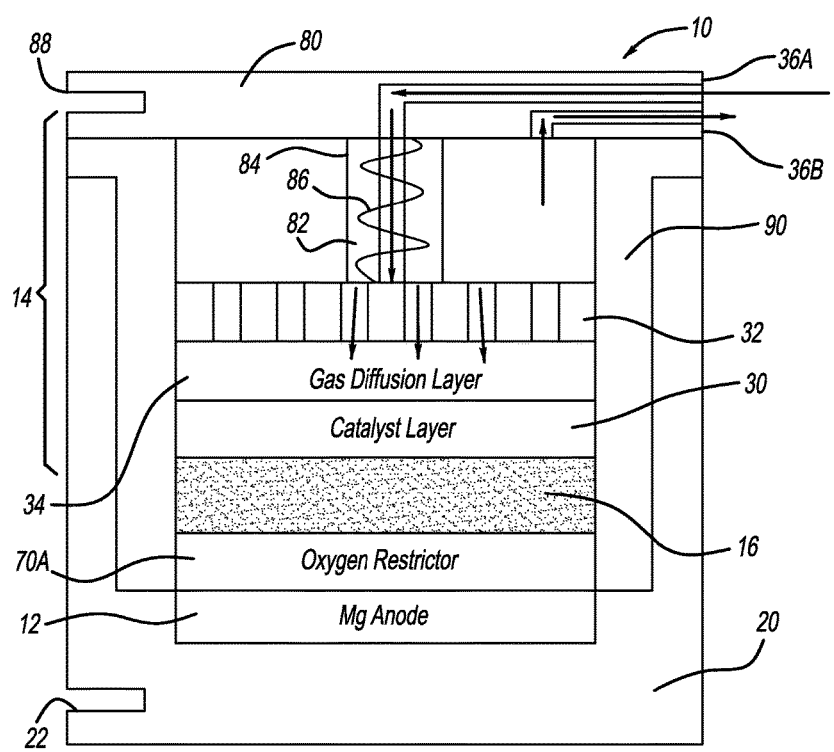
FIG. 2 is a cross-sectional view of another rechargeable magnesium oxygen battery according to the present teachings.
Figure 3:
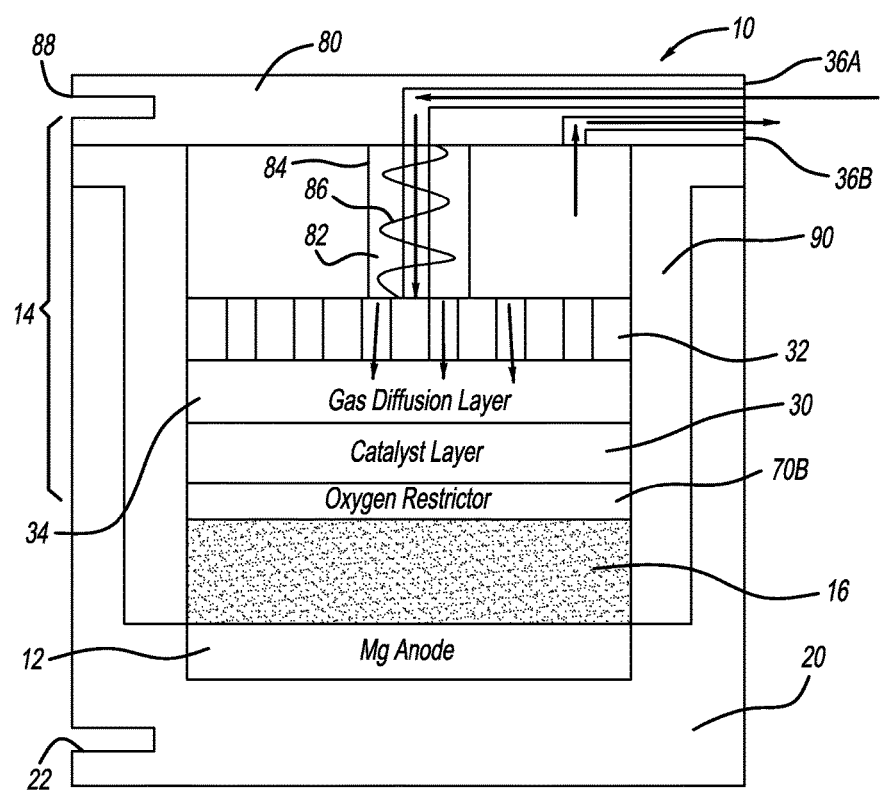
FIG. 3 is a cross-sectional view of an additional rechargeable magnesium oxygen battery according to the present teachings.

With reference to FIGS. 2 and 3, the oxygen restrictor can be an oxygen restrictor layer 70A and/or 70B made of any suitable material configured to restrict oxygen from crossing over from the positive electrode 14 to the negative electrode 12. As illustrated in FIG. 2, oxygen restrictor layer 70A can be at the negative electrode 12 and can cover the negative electrode 12. As illustrated in FIG. 3, oxygen restrictor layer 70B can be at the positive electrode 14 and can cover the catalyst layer 30. The battery 10 can include one or both of the oxygen restrictor layers 70A/70B. The oxygen restrictor layers 70A/70B can be made of any suitable material. For example, the oxygen restrictor layers 70A/70B can include any suitable selective membrane material, such as styrene type polyamine, acrylic acid polymer, or polysulfone. The oxygen restrictor layers 70A/70B can also be made of any suitable oxygen adsorbent materials.

While the present disclosure has been described with reference to embodiments thereof, it is to be understood that the disclosure is not limited to the embodiments and constructions. The present disclosure is intended to cover various modification and equivalent arrangements. In addition to the various combinations and configurations described, other combinations and configurations, including more, less or only a single element, are also within the spirit and scope of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rechargeable magnesium oxygen battery comprising:
   a negative electrode configured to absorb magnesium and release magnesium ion;
   a positive electrode configured to discharge product that includes magnesium and oxygen during a discharge process of the battery;
   a non-aqueous magnesium ion electrolyte layer between the negative electrode and the positive electrode; and
   an oxygen restrictor configured to restrict oxygen crossover from the positive electrode to the negative electrode;
   wherein the oxygen restrictor includes $O_2$ pass prevention materials present in the non-aqueous magnesium ion electrolyte layer.

2. The rechargeable magnesium oxygen battery of claim 1, wherein the $O_2$ pass prevention materials are porous and configured to absorb oxygen.

3. The rechargeable magnesium oxygen battery of claim 2, wherein the pore size of the $O_2$ pass prevention materials is greater than 10 Å.

4. The rechargeable magnesium oxygen battery of claim 2, wherein the $O_2$ pass prevention materials include $CeO_2$, $CeO_2$—$Zr$—$O_2$, $Ba(Sr)FeO_3$, $BaYMn_2O_5$, $Ca_2(Al_{0.5}Mn_{0.5})_2O_5$, or porous electrically-insulating compounds including: porous ceramics, meso porous silica, alumina-silica gel, or zeolite.

5. The rechargeable magnesium oxygen battery of claim 2, further comprising:
   the oxygen restrictor includes a first material layer between the positive electrode and the non-aqueous magnesium ion electrolyte layer; and
   the oxygen restrictor includes a second material layer between the negative electrode and the non-aqueous magnesium ion electrolyte layer.

6. The rechargeable magnesium oxygen battery of claim 1, wherein the oxygen restrictor includes an ion exchange membrane configured to restrict passage of $O_2$ therethrough.

7. The rechargeable magnesium oxygen battery of claim 6, wherein the ion exchange membrane includes a styrene type polyamine, an acrylic acid polymer, or a polysulfone.

8. The rechargeable magnesium oxygen battery of claim 6, wherein the membrane covers at least one of the positive electrode and the negative electrode.

9. The rechargeable magnesium oxygen battery of claim 1, wherein the negative electrode includes the metal including at least magnesium.

10. The rechargeable magnesium oxygen battery of claim 1, wherein the oxygen restrictor is a material layer between the negative electrode and the non-aqueous magnesium ion electrolyte layer.

11. The rechargeable magnesium oxygen battery of claim 1, wherein the oxygen restrictor is a material layer between the positive electrode and the non-aqueous magnesium ion electrolyte layer.

12. A rechargeable magnesium oxygen battery comprising:
   a negative electrode configured to absorb magnesium and release magnesium ion;
   a positive electrode configured to produce discharge product that includes magnesium and oxygen during a discharge process of the battery; and
   an oxygen adsorber between the negative electrode and the positive electrode configured to adsorb oxygen to prevent oxygen from crossing over to the negative electrode from the positive electrode;
   wherein the oxygen adsorber includes $CeO_2$, $CeO_2$—$Zr$—$O_2$, $Ba(Sr)FeO_3$, $BaYMn_2O_5$, $Ca_2(Al_{0.5}Mn_{0.5})_2O_5$, or porous electrically-insulating compounds including: porous ceramics, meso porous silica, alumina-silica gel, or zeolite.

13. The rechargeable magnesium oxygen battery of claim 12, wherein the oxygen adsorber includes perovskite-type oxide, brown millerite type oxide, porous metal complex, or gas adsorbent material.

* * * * *